(12) United States Patent
Altamura et al.

(10) Patent No.: US 8,986,160 B2
(45) Date of Patent: Mar. 24, 2015

(54) EPICYCLIC GEAR SYSTEM

(71) Applicant: Avio S.p.A., Turin (IT)

(72) Inventors: Paolo Altamura, Monopoli (IT); Edoardo Curti, Chieri (IT); Giovanni Oddone, Minervino Murge (IT); Michele Gravina, Minervino Murge (IT); Giulio Zagato, Moncalieri (IT)

(73) Assignee: Avio S.p.A., Turin (IT)

( * ) Notice: Subject to any disclaimer, the term of this patent is extended or adjusted under 35 U.S.C. 154(b) by 171 days.

(21) Appl. No.: 13/718,898

(22) Filed: Dec. 18, 2012

(65) Prior Publication Data
US 2013/0184120 A1 Jul. 18, 2013

(30) Foreign Application Priority Data

Dec. 23, 2011 (IT) .............. TO2011A1202

(51) Int. Cl.
*F16H 57/08* (2006.01)
*F16H 1/28* (2006.01)
(52) U.S. Cl.
CPC .............. *F16H 1/28* (2013.01); *F16H 1/2836* (2013.01)
USPC ....................................... 475/347
(58) Field of Classification Search
USPC ....................................... 475/347
See application file for complete search history.

(56) References Cited

U.S. PATENT DOCUMENTS

| | | | | |
|---|---|---|---|---|
| 3,427,901 A | * | 2/1969 | Wildhaber | 475/176 |
| 3,943,787 A | | 3/1976 | Hicks | |
| 4,617,839 A | * | 10/1986 | Matoba | 475/335 |
| 8,550,957 B2 | * | 10/2013 | Erno et al. | 475/347 |

FOREIGN PATENT DOCUMENTS

| | | | |
|---|---|---|---|
| DE | 3701729 | | 8/1988 |
| EP | 1028275 A2 | | 8/2000 |
| EP | 1837542 A2 | | 9/2007 |
| JP | 61211559 | | 9/1986 |
| JP | 63-231036 | * | 9/1988 |
| WO | WO 2009102853 | | 8/2009 |

OTHER PUBLICATIONS

Italian Search Report dated Mar. 20, 2012.

* cited by examiner

*Primary Examiner* — Sherry Estremsky
(74) *Attorney, Agent, or Firm* — McCarter & English, LLP

(57) ABSTRACT

In an epicyclic gear system, each planet gear is connected by a respective connecting pin to an asymmetric planet carrier having two plate portions connected to each other, and only one of which is connectable to a reaction member; and at least one end portion of each connecting pin and the plate portion connected to the reaction member are connected by a radially undulated annular wall flexible angularly and radially.

15 Claims, 4 Drawing Sheets

EPICYCLIC GEAR SYSTEM

The present invention relates to an epicyclic gear system.

More specifically, the present invention relates to an epicyclic gear system that may be used to advantage, though not exclusively, in wind power generation, to transmit power from the blades to the electric generating system, and in aircraft propulsion, to transmit power from a turbomachine to the propulsion system.

In the following description, specific reference is made to aircraft propulsion, but purely by way of example.

BACKGROUND OF THE INVENTION

Epicyclic gear systems used in aircraft propulsion comprise a sun gear; a ring gear; and a number of planet gears interposed between the sun gear and the ring gear and fitted to a planet carrier by respective connecting pins and with the interposition of sliding or rolling bearings.

A typical planet carrier configuration is asymmetrical, i.e. comprises two substantially plate portions, which are positioned facing each other on opposite axial sides of the planet gears, are connected integrally to each other by a number of cross members or tenons, and only one of which is connected integrally to a member stationary or rotary, depending on the configuration of the gear system—which reacts to the torque transmitted from the planet gears to the planet carrier.

As stated, each planet gear is connected to the planet carrier by a respective connecting or supporting pin, the opposite ends of which are connected—normally, though not necessary, locked—to the plate portions, and an intermediate portion of which supports a sliding or rolling bearing, e.g. with two sets of cylindrical rollers.

In the application considered, the planet gear bearings—regardless of whether they are sliding or rolling types—fail to allow for misalignment between the planet gear and respective supporting pin.

During operation of the gear system, the forces transmitted from the planet gears to the planet carrier deform the planet carrier and, in particular, result in relative rotation of the two plate portions.

Unless steps are taken to prevent it, this rotation deforms both the tenons and the supporting pins, the axes of which go from a rest condition, in which they are parallel to the axes of the sun gear and ring gear, to a work condition, in which they form, with the sun gear and ring gear axes, an angle of other than zero, and which varies, depending on the intensity of the forces transmitted and therefore on the degree of deformation of the planet carrier.

The deviation of the supporting pin axes, and therefore of the respective planet gear axes with respect to the ring gear and sun gear axes, results in uneven load distribution on the meshing teeth of the planet, sun and ring gears, and on the bearings, thus impairing operation of the gear system and normally significantly reducing the working life of its component parts.

Various solutions have been proposed to eliminate these drawbacks. A first consists in modifying the geometry of the component parts, and in particular of the bearing work seats, to compensate the effects of deformation under load; and a second consists in equally distributing the rigidity of the planet carrier and/or supporting pins to eliminate the effects of relative rotation of the plate portions on the bearing work seats.

Whereas the first only eliminates the effects of deformation at a given transmitted load value, the second effectively compensates the problem regardless of load.

One known solution, in accordance with the second solution and described, for example, in the Applicant's Patent U.S. Pat. No. 6,409,414, is to employ asymmetric supporting pins, i.e. with portions differing in rigidity from one axial end to the other. Though effective in balancing the effects of deformation under load, this solution calls for locally compensating not only the effects of the variation in rigidity along the axes of the supporting pins on load distribution on the bearing, but also asymmetrical centrifugal action on the planet carrier.

Another solution, in accordance with the second solution, is to provide weight-reducing slots around the pin supports on the plate portion connected to the torque reaction member, as described, for example, in Patent WO2009102853A1.

This solution has the advantage of allowing use of symmetrical pins, but involves severe stress on the plate portion, especially in applications involving severe loads and deformation.

SUMMARY OF THE INVENTION

It is an object of the present invention to provide an epicyclic gear system designed to solve the above problems, and in particular to reduce stress on the planet carrier.

According to the present invention, there is provided an epicyclic gear system comprising a sun gear; a ring gear; a number of planet gears meshing with the sun gear and ring gear; a planet carrier; and a connecting pin connecting each planet gear to the planet carrier; the planet carrier comprising a first and second plate portion on opposite sides of said planet gears, first connecting means for only connecting said first plate portion to a reaction member, and second connecting means for connecting said first and second plate portion to each other; flexible coupling means being interposed between at least one of said first and second plate portion and each said connecting pin; and the gear system being characterized in that said flexible coupling means comprise at least one elastically flexible portion, which is elastically flexible angularly and radially, and is curved in radial section to define at least one annular recess coaxial with said connecting pin.

In the gear system defined above, the recess is preferably elongated axially.

BRIEF DESCRIPTION OF THE DRAWINGS

A number of non-limiting embodiments of the present invention will be described by way of example with reference to the attached drawings, in which.

DETAILED DESCRIPTION OF THE INVENTION

Figure 1:
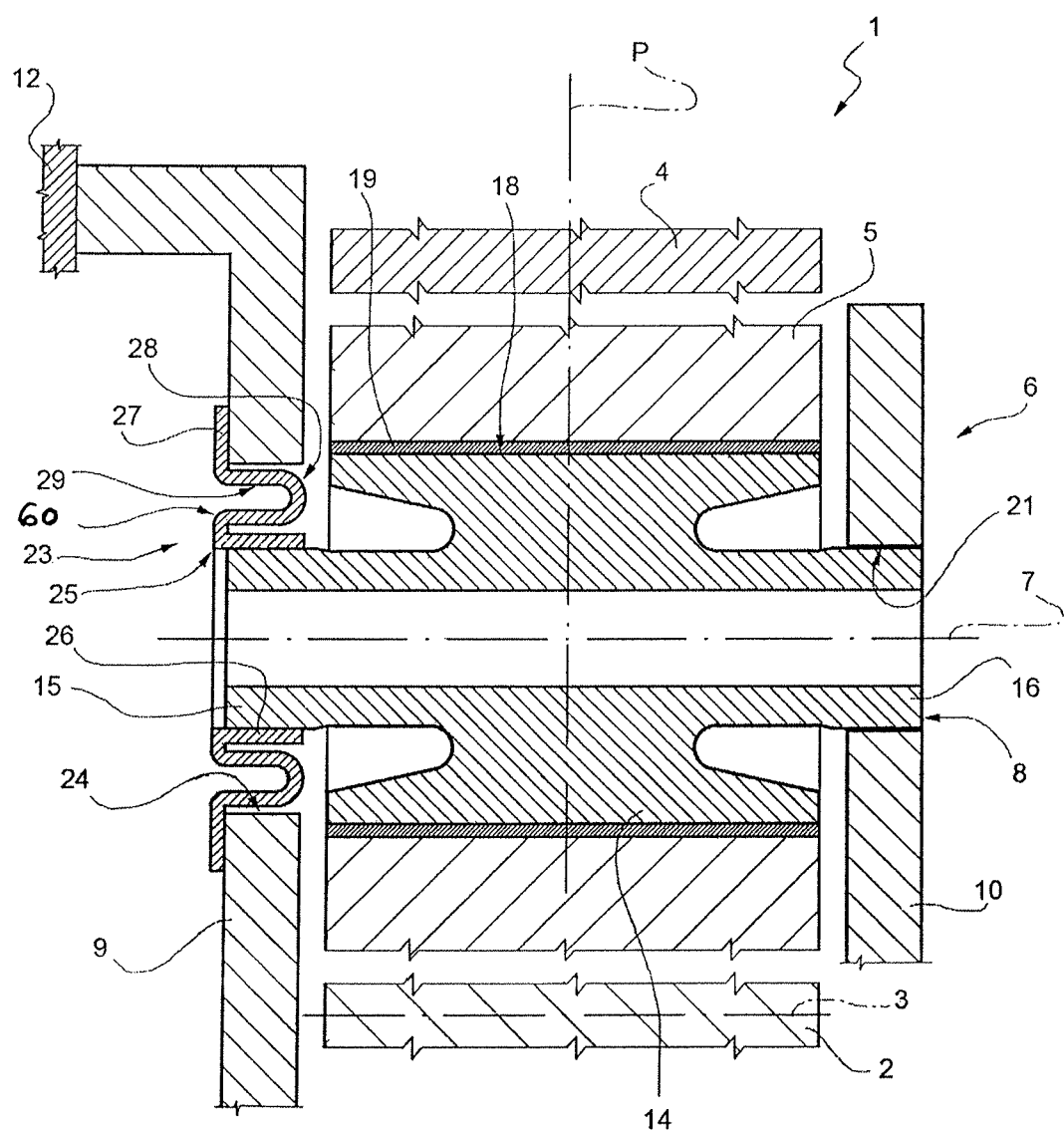
FIG. 1 shows a schematic, substantially in block form, of a preferred embodiment of the epicyclic gear system in accordance with the teachings of the present invention.

Number 1 in FIG. 1 indicates as a whole an epicyclic gear system, particularly but not necessarily for an aircraft engine (not shown).

Gear system 1 comprises a sun gear 2 which rotates about an axis 3; a ring gear 4 coaxial with axis 3; and a number of planet gears 5, e.g. bihelical gears, only one of which is shown in the drawings, and which mesh with ring gear 4 and sun gear 2.

Each planet gear 5 is fitted to a planet carrier 6, to rotate about a respective axis 7, by means of a respective connecting or supporting pin 8, whose axis is coincident with axis 7 and parallel to axis 3.

Planet carrier 6 is asymmetrical, i.e. not symmetrical with respect to a central axial plane P, perpendicular to axis 7, of planet gears 5.

Planet carrier 6 comprises two substantially plate portions 9 and 10 located on opposite axial sides of planet gears 5 and connected integrally to each other by a number of known axial tenons not shown.

Of portions 9 and 10, only portion 9 is connected integrally in known manner to a stationary or rotary member 12, which reacts to the torque transmitted from planet gears 5 to planet carrier 6.

Each connecting pin 8 is preferably, but not necessarily, symmetrical with respect to plane P and, in the example described, comprises an intermediate portion 14; and two tubular end connecting portions 15 and 16 of the same shape and size.

Intermediate portion 14 is bounded by a straight cylindrical surface 18 fitted with a bearing 19, and portion 16 engages, with substantially no clearance, a through axial hole 21 formed in plate portion 10.

As shown in FIG. 1, portion 15 of each pin 8 is connected to plate portion 9 with the interposition of an elastically flexible device 23 elastically flexible under both angular and any radial load.

In the FIG. 1 example, portion 15 loosely engages a through hole 24 formed through plate portion 9, and elastically flexible device 23 is defined by an interface body 25 conveniently formed in one piece.

In the example shown, interface body 25 is separate from plate portion 9 and pin 8, is axially symmetrical, and comprises a central tubular portion 26, which loosely engages through hole 24, and in which end portion 15 of pin 8 is inserted with substantially no clearance.

Body 25 also comprises a flange 27 for connection to plate portion 9; and an elastically flexible, curved intermediate annular wall 28 which, in radial half-section, is C-shaped or in the shape of a U on its side, and defines an axially elongated annular channel or recess 29 coaxial with axis 7 and having an outward-facing axial opening 60 (FIG. 1).

In a variation not shown, wall 28 has two or more radial slots or openings, which define two or more curved, angularly and radially flexible arms or spokes, each of which defines a respective portion of annular recess 29.

Figure 2:
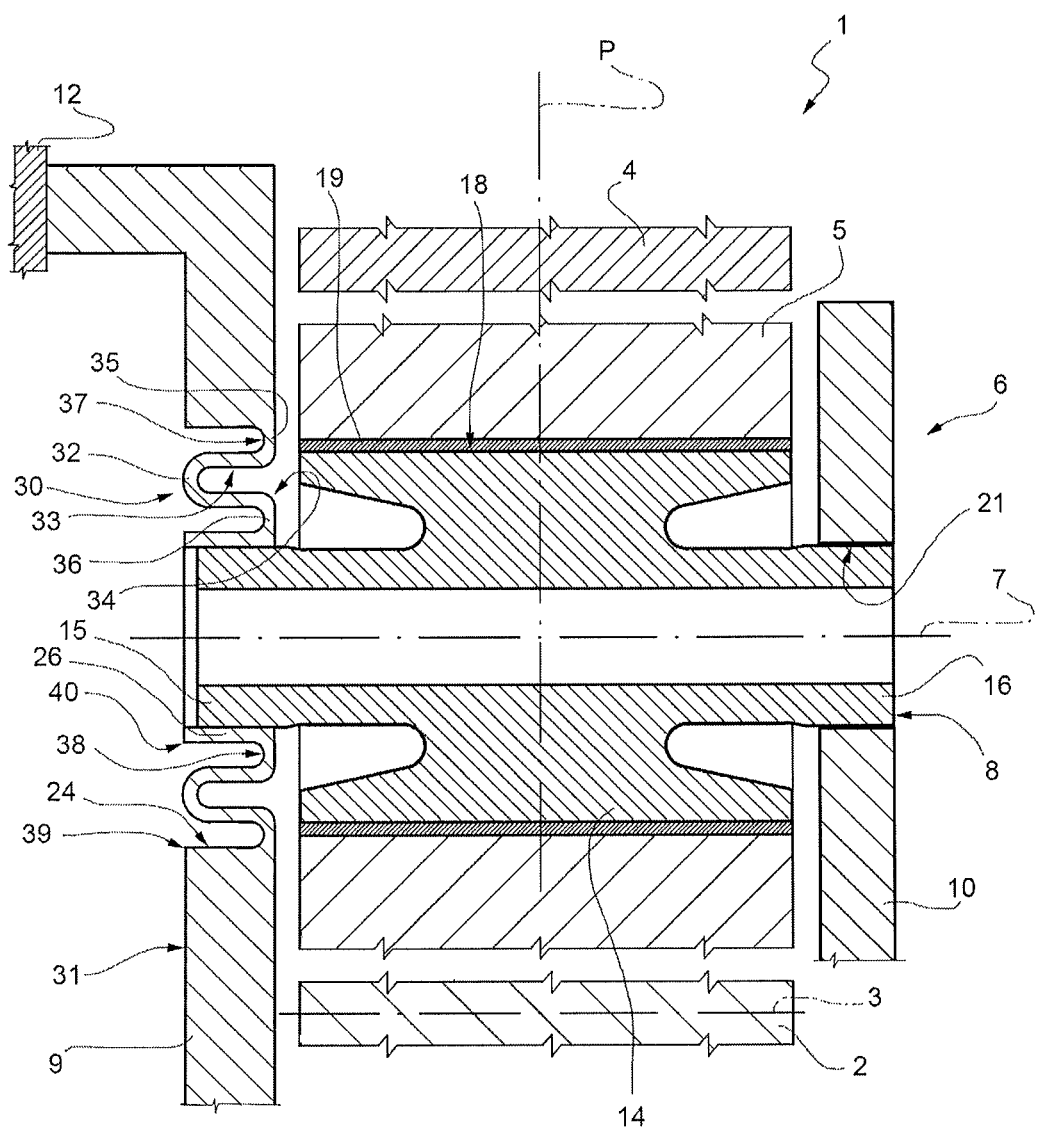
FIG. 2 is similar to, and shows a variation of a detail in, FIG. 1.
Figure 3:
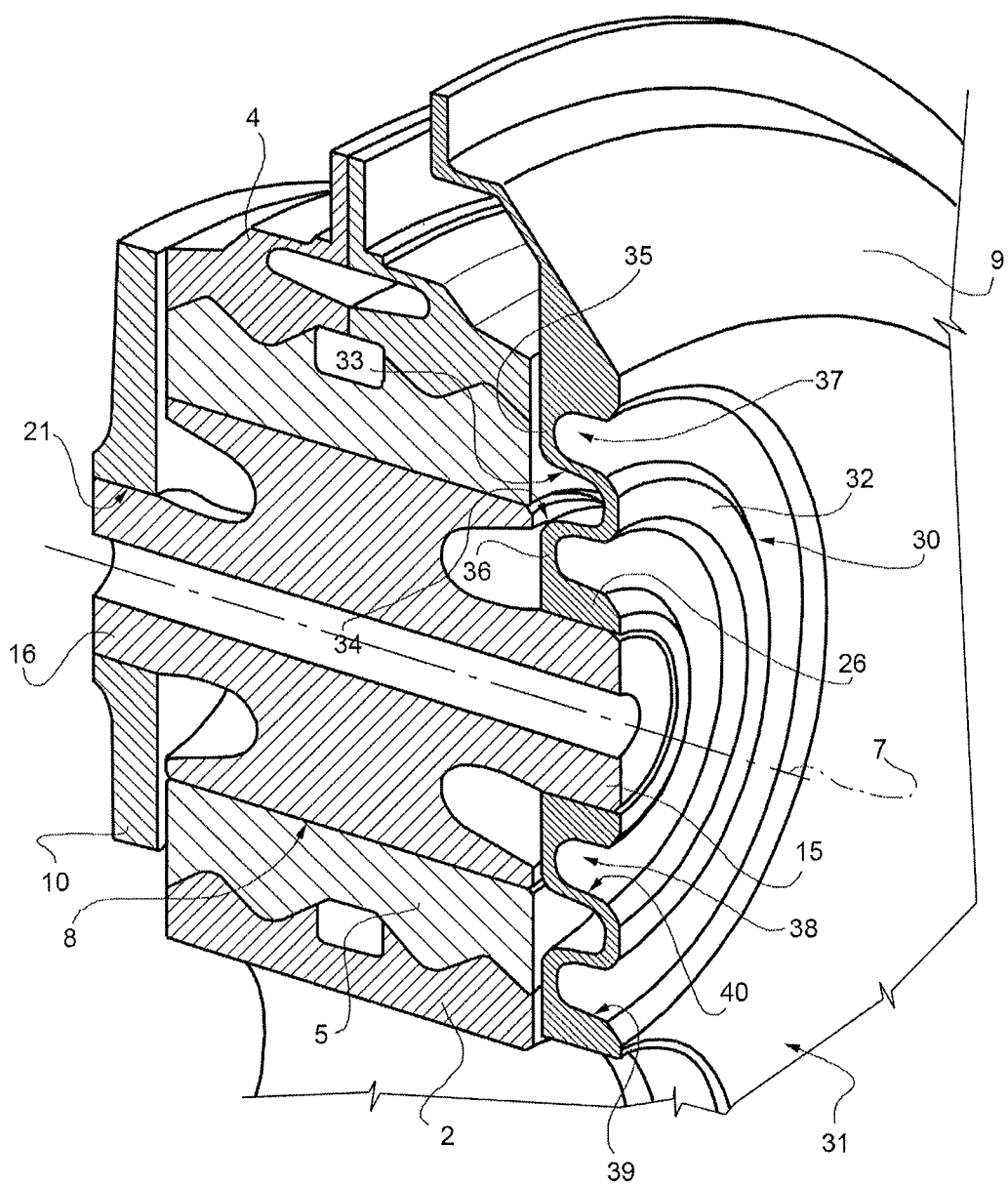
FIG. 3 shows a view in perspective, with parts removed for clarity, of the FIG. 2 gear system.

In the FIGS. 2 and 3 variation, each intermediate annular wall 28 is replaced with a different curved annular wall 30, which is preferably axially symmetrical, is housed inside through hole 24, surrounds portion 15 of pin 8, and, together with plate portion 9, forms part of a one-piece body 31.

Wall 30 is undulated radially, and comprises an intermediate annular portion 32 substantially in the form of a C or a U on its side, and which defines an axially elongated annular recess 33 coaxial with axis 7 and having an axial opening 34 facing intermediate portion 14 of pin 8. Wall 30 also comprises two substantially radial, curved annular portions 35, 36 extending, coaxially with axis 7, outwards and inwards of portion 32 respectively. Together with portion 32 and an inner surface of plate portion 9, portions 35 and 36 define respective annular channels or recesses 37 and 38 coaxial with axis 7 and having respective axial openings and 40 facing the opposite way to opening 34 of recess 33, i.e. outwards, as shown in FIGS. 2 and 3.

Figure 4:
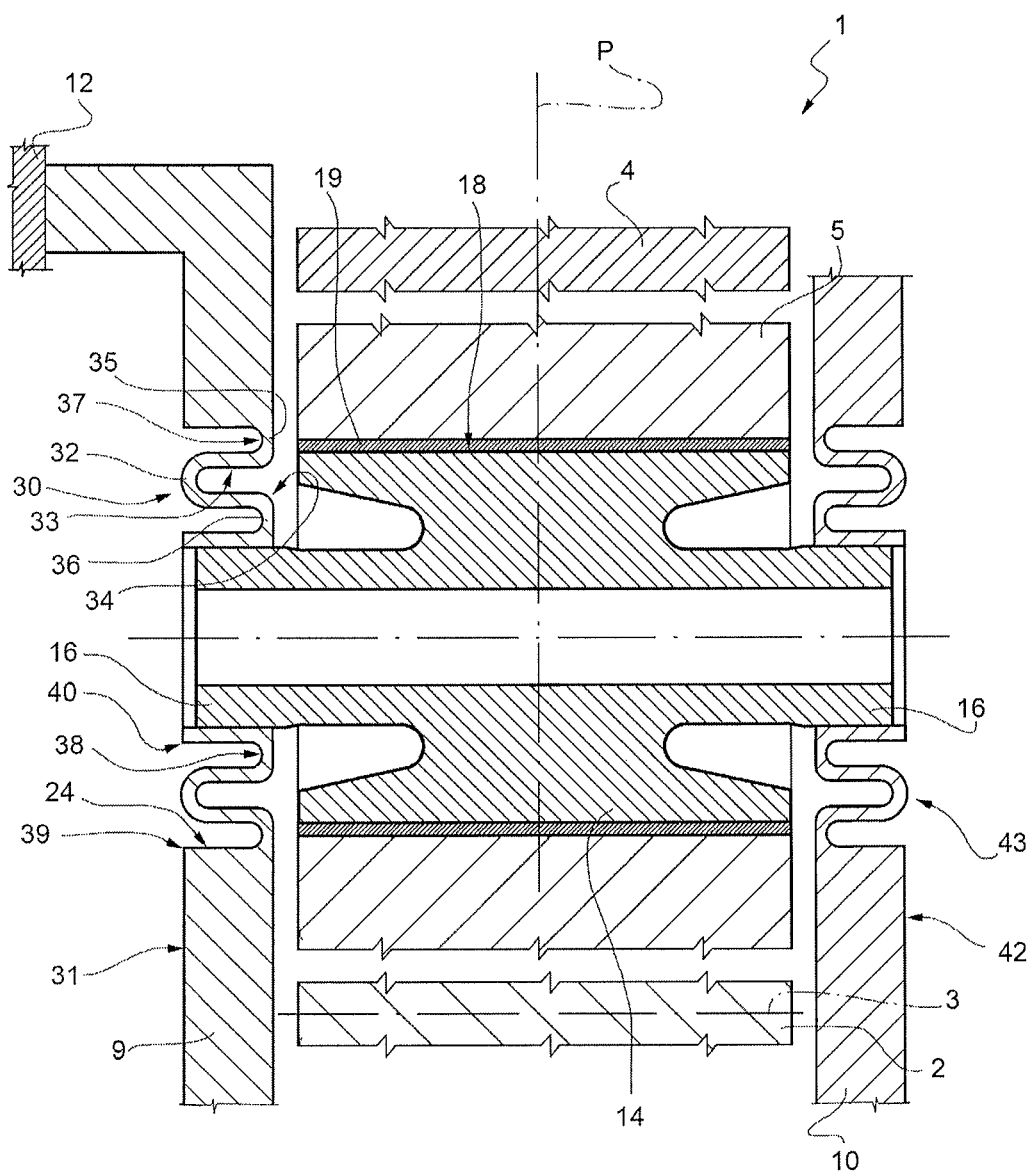
FIG. 4 shows a variation of a detail in FIG. 2.

In the FIG. 4 variation, plate portion 10 is replaced with a one-piece body 42 identical in design to body 31. End portions 16 of pins 8 are thus also connected elastically flexibly to plate portion 10, and more specifically by respective elastically flexible annular walls 43. Conveniently, each wall 43 is structurally and functionally identical to wall 30.

In a variation not shown, wall 43 is still angularly and radially flexible, but is different in shape from wall 30.

Both end portions 15, 16 of each pin 8 are thus connected to planet carrier 6 by respective relative-motion assemblies, which allow relative portions 15, 16 to move angularly and in any radial direction independently of each other and of both plate portions 9, 10.

The particular design of elastically flexible walls 25, 30, 43 therefore ensures controlled movement of end portions 15, 16 of pins 8 with respect to relative plate portions 9, 10 in any radial and angular direction.

More specifically, using curved or undulated flexible portions at least between portions 15 of pins 8 and plate portion 9 of planet carrier 6 ensures and maintains correct alignment under load of teeth and bearings in any operating condition.

On the other hand, using radially and angularly flexible portions between both plate portions 9, 10 and respective portions 15, 16 of pins 8 provides for compensating deformation under load and maintaining correct alignment of teeth and bearings, as well as for generally reducing the rigidity of planet carrier 6, which is particularly beneficial in epicyclic gear systems to minimize their sensitivity to manufacturing errors.

Finally, using undulated walls between the planet carrier and at least one end of connecting pins 8, a high, optimum degree of flexibility and limited stress of the material can be achieved by simply varying the number of undulations, and therefore the number of recesses defined by walls 25, 30, 43, and the axial extension and thickness of walls 25, 30, 43.

Obviously, walls 25, 30, 43 may have a different number of undulations, a different axial extension, and portions with different curvatures and/or thickness from those described and illustrated.

What is claimed is:

1. An epicyclic gear system comprising a sun gear;
  a ring gear;
  a number of planet gears meshing with the sun gear and ring gear;
  a planet carrier; and
  a connecting pin connecting each planet gear to the planet carrier;
  the planet carrier comprising a first and second plate portion on opposite sides of said planet gears, said first plate portion connected to a stationary or rotary member, and said first and second plate portions connected to each other;
  flexible coupling means being interposed between at least one of said first and second plate portion and each said connecting pin; and
  the gear system being characterized in that said flexible coupling means comprise at least one elastically flexible portion, which is elastically flexible angularly and radially, and is curved in radial section to define at least one annular recess coaxial with said connecting pin;
  wherein the elastically flexible portion and the respective plate portion form part of a one-piece body.

2. A gear system as claimed in claim 1, characterized in that said annular recess is elongated axially.

3. A gear system as claimed in claim 1, characterized in that said elastically flexible curved portion is substantially C-shaped.

4. A gear system as claimed in claim 1, characterized in that said elastically flexible curved portion forms part of a radially undulated annular wall surrounding said connecting pin; said undulated annular wall defining said annular recess.

5. A gear system as claimed in claim 4, characterized in that said undulated annular wall at least partly defines at least one further annular recess coaxial with said connecting pin and having an axial inlet facing the opposite way to an axial inlet of said annular recess.

6. A gear system as claimed in claim 4, characterized in that said undulated annular wall at least partly defines two equioriented further annular recesses coaxial with said connecting pin; said further annular recesses being located inwards and outwards of said annular recess respectively.

7. A gear system as claimed in claim 4, characterized in that said undulated annular wall is axially symmetrical.

8. A gear system as claimed in claim 1, characterized in that said flexible coupling means are interposed between said first plate portion and each said connecting pin.

9. A gear system as claimed in claim 1, characterized in that said flexible coupling means are interposed between said second plate portion and each said connecting pin.

10. An epicyclic gear system comprising a sun gear;
a ring gear;
a number of planet gears meshing with the sun gear and ring gear;
a planet carrier; and
a connecting pin connecting each planet gear to the planet carrier;
the planet carrier comprising a first and second plate portion on opposite sides of said planet gears, said first plate portion connected to a stationary or rotary member, and said first and second plate portions connected to each other;
flexible coupling means being interposed between at least one of said first and second plate portion and each said connecting pin; and
the gear system being characterized in that said flexible coupling means comprise at least one elastically flexible portion, which is elastically flexible angularly and radially, and is curved in radial section to define at least one annular recess coaxial with said connecting pin;
wherein the elastically flexible curved portion forms part of a radially undulated annular wall surrounding the connecting pin, the undulated annular wall defining the annular recess; and
wherein the undulated annular wall at least partly defines two equioriented further annular recesses coaxial with the connecting pin, the further annular recesses being located inwards and outwards of the annular recess respectively.

11. A gear system as claimed in claim 10, characterized in that said flexible coupling means are interposed between said first plate portion and each said connecting pin.

12. A gear system as claimed in claim 10, characterized in that said flexible coupling means are interposed between said second plate portion and each said connecting pin.

13. A gear system as claimed in claim 10, characterized in that said elastically flexible portion forms part of an interface body separate from the relative said plate portion.

14. A gear system as claimed in claim 13, characterized in that said elastically flexible portion loosely engages an axial through opening formed through the relative said plate portion.

15. A gear system as claimed in claim 13, characterized in that said interface body is formed in one piece.

* * * * *